United States Patent
Keskari

[15] 3,634,910
[45] Jan. 18, 1972

[54] FASTENER FOR CLOTHING

[72] Inventor: Charlotte Keskari, Kelkheim, Taunus, Germany

[73] Assignee: L. Keskari & Co., Hamburg, Germany

[22] Filed: May 18, 1970

[21] Appl. No.: 38,320

[30] Foreign Application Priority Data

June 3, 1969 Germany...................P 19 28 317.1

[52] U.S. Cl. ..........................................24/69 SK, 24/241 SP
[51] Int. Cl. ...................................A44b 13/00, A43c 11/00
[58] Field of Search............24/210, 69 SK, 69 R, 242, 241 S, 24/241 SP, 233

[56] References Cited

UNITED STATES PATENTS

| 469,237 | 2/1892 | Fontan | 24/210 |
|---|---|---|---|
| 573,550 | 12/1896 | Steinberger | 24/210 |
| 359,033 | 3/1887 | Prahar | 24/210 |

FOREIGN PATENTS OR APPLICATIONS

| 24,616 | 12/1914 | Great Britain | 24/210 |
|---|---|---|---|
| 247,946 | 11/1910 | Germany | 24/210 |

*Primary Examiner*—Bernard A. Gelak
*Attorney*—Beaman & Beaman

[57] ABSTRACT

The fastener comprises a baseplate, a pin fixed on the baseplate and projecting therefrom, a spring mounted at the baseplate and a two-armed lever pivoted at the baseplate. The lever is forced by the spring with its long arm into engagement with the pinhead. A recess and a groove are formed on the underside of the long lever arm, the recess being eccentrically arranged with respect to the pin. The pinhead engages the groove under action of the spring and snaps into the recess with additional closing pressure exerted on the long lever arm. The fastener allows a secure closure of fur coats and avoids damage of the fur.

5 Claims, 5 Drawing Figures

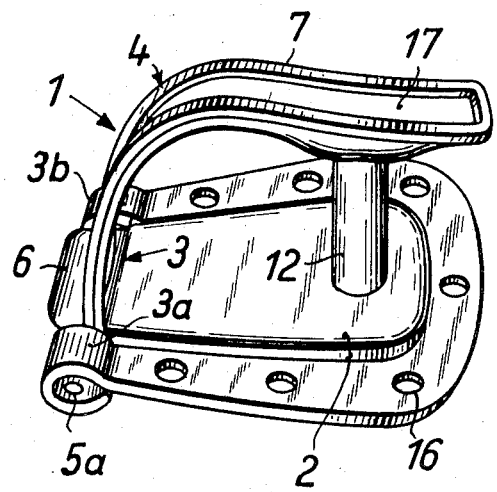
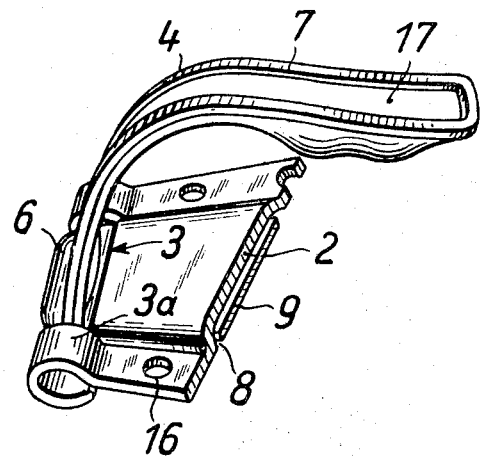
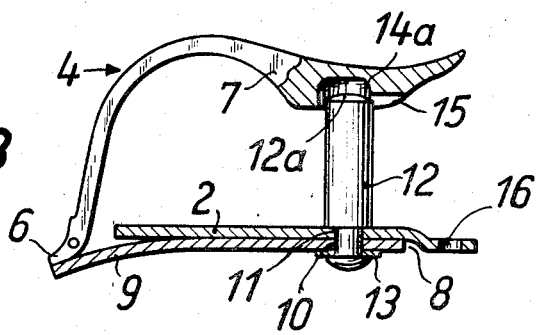
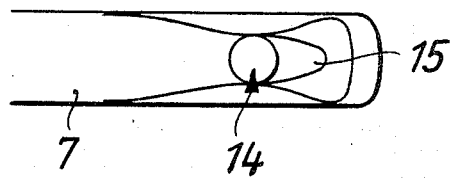
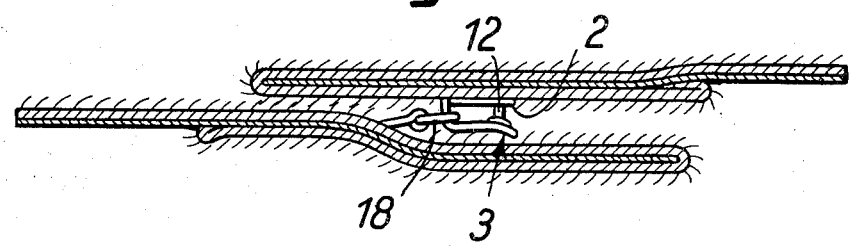

3,634,910

FASTENER FOR CLOTHING

BACKGROUND OF THE INVENTION

The invention relates to a fastener for clothing, especially furcoats and other furs.

Fasteners for fur clothing are intended to enable a detachable and if possible invisible connection between the two parts of a clothing. The connection must safely hold but in so doing is not allowed to impair the fit of the furcoat or, in the case of clothing not made of fur, to cause unfashionable formation of folds. For this purpose, fasteners have been provided which consist essentially of a baseplate to be fastened at the one clothing part, comprising a spring lever and a pin, and a loop to be fastened at the other clothing part. One arm of the spring lever cooperates with the pin and the other arm with a leaf spring mounted on that side of the baseplate facing away from the pin. The lugs of the spring lever determining the pivot axis thereof, are supported in bearing shells of the baseplate open towards the leaf spring. A snap function is provided by the cooperation of the leaf spring and the short lever arm and the spring lever is always resiliently forced into one of its end positions. In order to connect the clothing parts, the loop is pushed over the long arm of the spring lever and is thereupon secured by the longer lever arm supported on the pin and subjected to the spring action, said pin being in engagement with a recess formed in the lever.

Fasteners are known which comprise a curved L-shaped upper member and a pin, said member, however, being rigidly connected with the baseplate. The loop must be forced through a gap between said member and the pin against the force of a leaf spring. In this case the baseplate is arranged on the fur in such manner that the L-shaped member extends parallel to the fur edge and not vertically thereto as is the case with fasteners with a turnup lever. These fasteners, however, did not prove to be practical, because it is very troublesome to thread the loop over the L-shaped member, because the latter is hidden in the dense fur. Additionally, a leaf spring supported on the pin will never be able to close the gap as tightly as is the case, for instance, with a pin which in the closed position snaps into a recess. If, to increase the closing power, a very strong leaf spring is used, the tender fur material may be damaged due to the considerable tensional forces to be applied.

It is an object of the invention to provide a fastener with improved snapping function in comparison with the simple snapping function of the spring, and to increase the closing power thereof. It is another object of the invention to secure the bearing lugs of the lever against jumping out of the bearing at the narrow side of the baseplate in case of unskilled displacement of the lever. Another object of the invention is to provide a fastener with a leaf spring arranged on the one side of the baseplate, the spring being mounted in such a manner that it will remain fixed against rotation in case its rivet joint should loosen so that the spring always cooperates with the shorter lever arm. In this arrangement, the spring is to have a only small projection with respect to the baseplate on the side facing away from the lever.

SUMMARY OF THE INVENTION

In accordance with the invention, the recess in the longer lever arm adapted to come into engagement with the pin, is arranged slightly eccentrically with respect to the axis of the pin, so that a special pressure is required to cause the pin to snap into the recess. In order to guide the head of the pin safely towards the pan-shaped recess, the lever is still provided with a groove extending from the edge of the recess and tapering towards the end of the longer lever arm. When the lever arm and the pin contact each other, the rounded head of the pin first engages within the grooves and then with increasing pressure slides towards the recess, finally entering thereinto in snapping engagement.

The leaf spring by its snapping function determines both end positions of the preferably L-shaped longer lever arm and contributes in keeping the fastener shut. The main portion of the closing force, however, is provided by the snapped-in pin, which is allowed by the elastic properties of pin and lever material. The forces required for the closing and opening are substantially greater than with a closing force exerted by a spring-loaded lever alone, and an inadvertant opening is rather impossible.

In order to prevent a possible rotary movement of the leaf spring about the rivet joint, i.e., about the pin, the spring is inlaid in a depression formed in the baseplate. The thickness of the assembly is reduced in this way and the fastener may be sewed in easier.

The bearing lugs of the spring lever are prevented from jumping out of the bearing shells in that extensions provided at the narrow side of the baseplate, are rolled about these lugs to form closed hinge sleeves.

BRIEF DESCRIPTION OF THE DRAWING

Other objects and advantages will become readily apparent from a reading of the following specifications and a study of the accompanying drawings. In the drawings, FIG. 1 is an overall perspective view of a fastener according to the invention;

FIG. 2 shows a partial perspective view of the fastener including a sectional view taken approximately at the center of the baseplate;

FIG. 3 is a longitudinal sectional view of the fastener shown in FIG. 1;

FIG. 4 is a plan view taken on the underside of the spring lever showing the groove and the recess for the reception of the pin, and FIG. 5 is a sectional view on a reduced scale of a fastener employed with a fur material.

DESCRIPTION OF THE PREFERRED EMBODIMENT

The fastener 1 comprises a substantially rectangular baseplate 2 having its corners rounded at the one short side thereof. The other short side is slightly shortened and provided with two extensions rolled in to form closed hinge sleeves 3a and 3b (FIG. 1) in such a manner that the pivot axis of the hinge lies in the plane of the baseplate 2. A spring lever 4 is supported in the spaced hinge sleeves by means of two lateral lugs 5a and 5b formed integrally with the spring lever 4. The spring lever 4 is a two-armed lever with a shorter lever arm 6 and a longer lever arm 7 which is substantially formed like an L.

The baseplate 2 is provided with a groove 8 on the underside which groove appears as a projection on the upper side. A leaf spring 9 is arranged in this groove extending beyond the hinge axis, the depth of the groove being selected in accordance with the thickness of the spring (FIG. 2). Bores 10 and 11 (FIG. 3) are provided in the spring 9 and the baseplate 2 near the end facing away from the hinge 3. The thinner portion of a cylindrical pin 12 is inserted in the bores from the upper side and riveted on the baseplate 2 to fasten pin and spring after a washer 13 has been placed on (FIG. 3).

The spring 9 presses itself against the shorter lever arm 6 between the hinge sleeves 3a and 3b, with the spring force acting in direction towards the axis of rotation of the two-armed lever 4. Two positions of the lever are characterized with respect to the baseplate by the cooperation of the lever arm 6 and the spring 9. In the one position, the lever 4 has been pivoted about the axis of rotation against the force of the spring in such a manner that the long lever arm 7 is pivoted away from the baseplate 2. In the other position, the lever arm 7 lies on the pin 12. During the lever movement from the one position into the other, the spring is bent off at maximum.

The spring lever 4 is provided with a panlike recess 14 in its long arm 7. The circular recess has approximately the same diameter as the pin 12 provided on the projection on the baseplate. The recess 14 is slightly eccentrically offset towards the hinge 3 as compared with the pin 12, so that in the above-described contact position between lever arm 7 and pin 12 the recess 14 is not arranged exactly above the upper end of the pin 12. The lever arm 7 is furthermore provided with a groove 15 with its deepest and broadest point being arranged at the edge of the recess 14 and which groove tapers towards the end of the lever arm 7 (FIG. 4), the depth of the recess 14 being greater than the maximum depth of the groove 15. Because of the eccentric arrangement of the recess and the pin, the latter has part of its rounded end face 12a engaging with the groove 15. When closing by the exertion of pressure on the lever arm 7, the pin is guided in the groove by its upper portion towards the recess center point until it slips into the deeper recess 14 for snapping engagement therein, with an elastic deformation occurring. Then the pin 12 presses itself tightly against that part of the inner face 14a of the circular recess 14 averted from the hinge (FIG. 3).

The baseplate 2 is provided with some bores 16 along the flange around said groove 8 in order to sew the fastener to the one part of the garment, for instance a fur. The parts of the fastener remaining visible may be covered with a type of leather matching with the fur, the leather being pasted by means of an adhesive in a groove 17 provided on the upper surface of the lever arm. The bottom of the groove 17 may be provided with impressions (not shown). To close the coat when the fastener 1 is open, i.e., when the spring lever 4 is swung off from the pin 12, a loop 18, which is fastened at the other part of the coat, is pushed over the long arm 7 of the spring lever 4. Then the lever 4 is swung back while overcoming the spring force, and the pin 12 comes into engagement with the recess 14 while overcoming the elastic deforming force as described.

The fastener is arranged vertically with respect to the edge of the fur so that the loop 18 with closed fastener will draw at the short leg of the L-shaped spring lever 4 directly adjacent to the pivot axis of the hinge 3. Even with stronger forces acting on the loop or the ring (for instance a person leaving a car when the coat will frequently slide) the fastener remains closed, because the tensional forces near to the hinge are acting at a very short lever arm and therefore are not great enough to open the interlocking engagement of the long lever arm with the cylindrical pin.

The spring 9 is made of spring steel, and the other parts of the fastener may be made of iron, brass, light metal or plastics; the plastics may in particular by a synthetic resin.

What I claim is:

1. A fastener for interconnecting two portions of clothing together, especially furcoats, wherein a loop is fastened to one of the clothing portions, comprising, in combination, a baseplate adapted to be attached to the other clothing portion, a pin fixed on said baseplate and projecting therefrom, said pin having a free end spaced from said baseplate, a leaf spring mounted upon said baseplate, a lever pivot defined on said baseplate, a lever pivotally mounted on said baseplate by said lever pivot having a short arm and a long arm located on opposite sides of said lever pivot and pivotal between open and closed positions, said spring engaging said short arm maintaining said lever in the open position and biasing said lever toward the closed position when said long arm is disposed adjacent said pin, said long arm including a first portion adjacent said lever pivot transversely disposed to said baseplate adapted to be engaged by the loop when said fastener is closed and a second end portion disposed adjacent the free end of the pin when the fastener is closed, a recess defined in said long arm second portion adapted to receive said pin free end, said recess being slightly offset with respect to said pin free end when said lever second portion is disposed adjacent said pin free end to produce a frictional engagement between said recess and pin free end upon said pin end being received in said recess.

2. In a fastener as in claim 1 wherein a groove is defined in said lever second portion intersecting said recess for guiding said pin free end into said recess.

3. In a fastener as in claim 1, a groove defined in said baseplate, said leaf spring being at least partially supported within said groove.

4. In a fastener as in claim 1, wherein said lever pivot comprises a pair of lateral extending lugs defined on said lever, and a pair of hinge sleeves defined on said baseplate, a lug being received within each of said sleeves.

5. In a fastener as in claim 1, a depression defined in said lever second portion surrounded by a rim and having formed impressions defined therein.

* * * * *